(12) United States Patent
Rosaen

(10) Patent No.: US 8,371,453 B2
(45) Date of Patent: Feb. 12, 2013

(54) BOTTOM FEED LIQUID FILTER

(75) Inventor: Nils N. Rosaen, Ann Arbor, MI (US)

(73) Assignee: Rosedale Products, Inc., Ann Arbor, MI (US)

( * ) Notice: Subject to any disclaimer, the term of this patent is extended or adjusted under 35 U.S.C. 154(b) by 352 days.

(21) Appl. No.: 12/765,095

(22) Filed: Apr. 22, 2010

(65) Prior Publication Data

US 2010/0270231 A1   Oct. 28, 2010

Related U.S. Application Data

(60) Provisional application No. 61/171,481, filed on Apr. 22, 2009.

(51) Int. Cl.
*B01D 35/027* (2006.01)
*B01D 35/28* (2006.01)
*B01D 35/30* (2006.01)
*B01D 35/34* (2006.01)

(52) U.S. Cl. ........ 210/440; 210/244; 210/441; 210/443; 210/451; 210/452; 210/455

(58) Field of Classification Search .................. 210/207, 210/244, 321.6, 433.1, 438, 439, 440, 441, 210/442, 443, 444, 448, 449, 451, 452, 455, 210/473, 474, 475, 477
See application file for complete search history.

(56) References Cited

U.S. PATENT DOCUMENTS

| | | | |
|---|---|---|---|
| 3,206,034 A * | 9/1965 | Anderson | 210/347 |
| 3,931,015 A | 1/1976 | Jenkins | |
| 4,460,468 A * | 7/1984 | Morgan | 210/445 |
| 4,701,259 A | 10/1987 | Rosaen | |
| 6,116,429 A | 9/2000 | Kirsgalvis | |

* cited by examiner

*Primary Examiner* — John Kim
(74) *Attorney, Agent, or Firm* — Babcock IP, PLLC

(57) ABSTRACT

A liquid filter, with a housing inlet port and outlet port arranged at the bottom of the liquid filter. The liquid filter may also be configured with an inward projecting domed top cover and/or an eccentric septum plate supporting a desired filter element and/or filter basket. The inward projecting domed top cover configurable with respect to the septum plate to retain the desired filter element and/or filter basket in place when in a closed position.

15 Claims, 4 Drawing Sheets

BOTTOM FEED LIQUID FILTER

BACKGROUND

1. Field of the Invention

The present invention generally relates to liquid filters and/or strainers. More specifically, the present invention relates to a liquid filter with a process input connection positioned at a bottom of the filter housing.

2. Description of Related Art

Liquid filters are used in a wide range of processes to remove contaminants from liquids.

Prior liquid filters, for example as shown in FIG. 1 and further disclosed in U.S. Pat. No. 4,701,259, "Fluid Filter with Filter Retainer", by Nils Rosaen, issued Oct. 20, 1987, are configured with a filter element suspended within a cylindrical housing supported by a filter basket. In a filtering mode, process liquid flows through a sidewall inlet port into an upper area of the housing. Process liquid passing through the filter element and filter basket exits the housing through an outlet port at the bottom of the housing. The filter housing is accessed, for example to exchange the filter element, via a top cover. To provide the housing with sufficient pressure capacity, the planar top cover is formed from a metal plate material of increased thickness.

When the process is interrupted for filter maintenance, unless additional valving and process piping is applied to drain the filter housing, when the top cover is removed to access the filter, the filter housing may remain full of liquid, requiring the operator to reach into the process liquid to grasp the submerged filter element.

Should process flow through the filter momentarily reverse, for example due to hydraulic shocks during process interruptions and/or interconnection changes, the filter basket and/or filter may lift from its supporting filter basket and/or sidewall shoulder enabling process fluid to bypass the filter element. Prior liquid filter housings have applied additional structures, such as spider arrangements and/or retaining legs extending inward from the top cover to retain the filter element and/or filter basket in place. These additional structures provide surfaces on which process liquid contaminant buildup and/or fouling may occur.

Competition within the liquid filter industry has focused attention upon minimization of materials and manufacturing costs. Also, ease of installation/service, and requirements for interconnecting piping are significant factors for commercial success.

Therefore, it is an object of the present invention to provide an apparatus that overcomes deficiencies in the prior art.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

The inventor has recognized deficiencies of the prior filter design. Specifically, the materials and manufacturing costs related to dimensioning the filter housing with an upper area sidewall inlet port and/or thick planar top cover is inefficient for several reasons.

First, the overall height of the filter housing is increased, above the top of the filter, to allow for connection space and/or clearance from the top cover connection, which increases the required installation space, the materials cost of the filter assembly and the liquid volume added to the overall process system.

Second, the upper area side inlet port connection may increase the complexity, cost and associated pressure drop of interconnecting process piping.

Third, the thickness of the top cover required to satisfy pressure requirements significantly increases the material cost of this component.

Fourth, the filter element is not positively retained in place, enabling the potential for unseating of the filter element and filter bypassing flow of the process liquid. If additional elements retaining the filter element in place with respect to the top cover are applied, materials cost, manufacturing complexity and maintenance requirements are increased.

Figure 1:
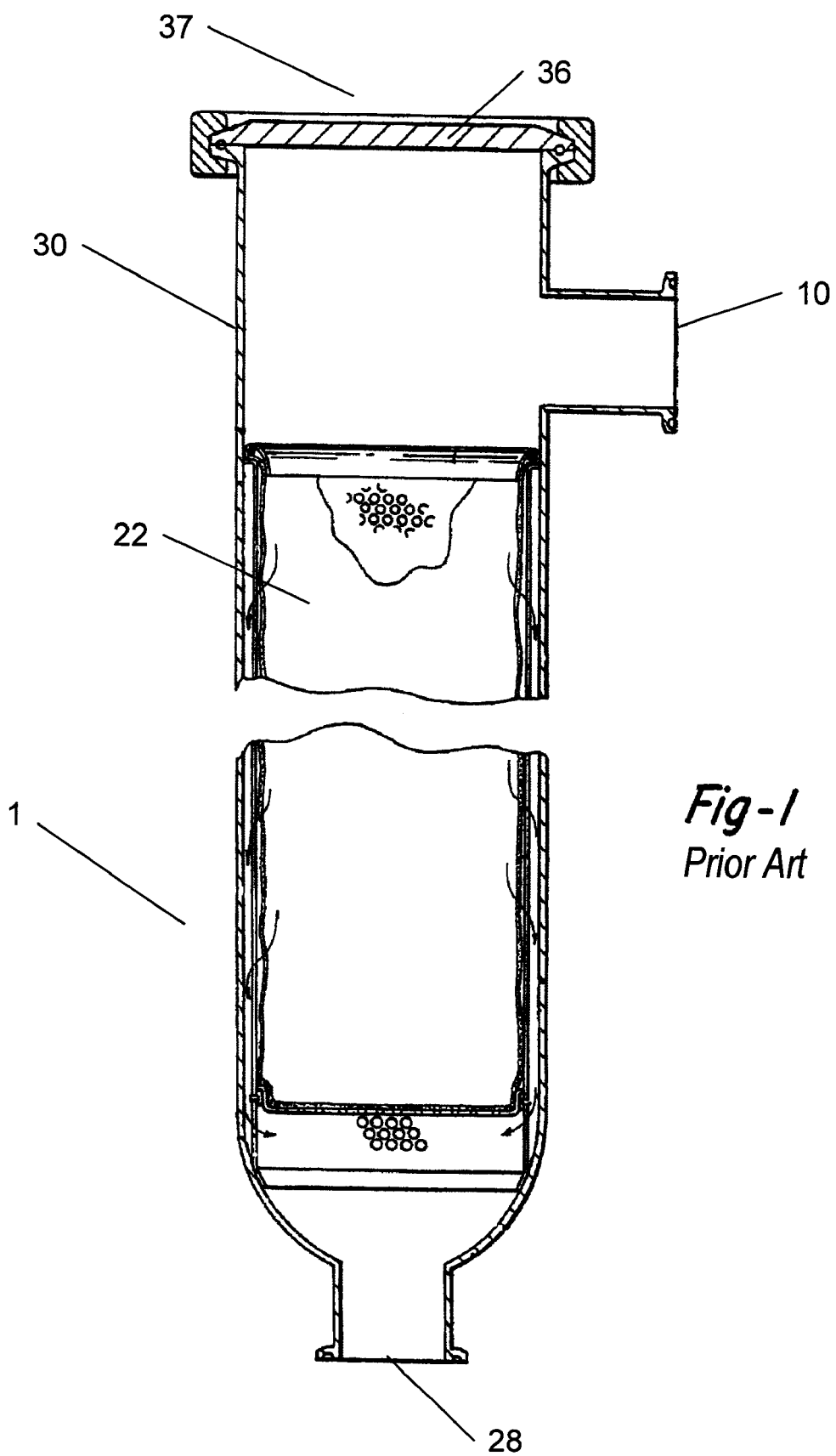
FIG. 1 is a schematic cut-away side view of an exemplary prior art liquid filter housing, disclosed in U.S. Pat. No. 4,701,259.
Figure 2:
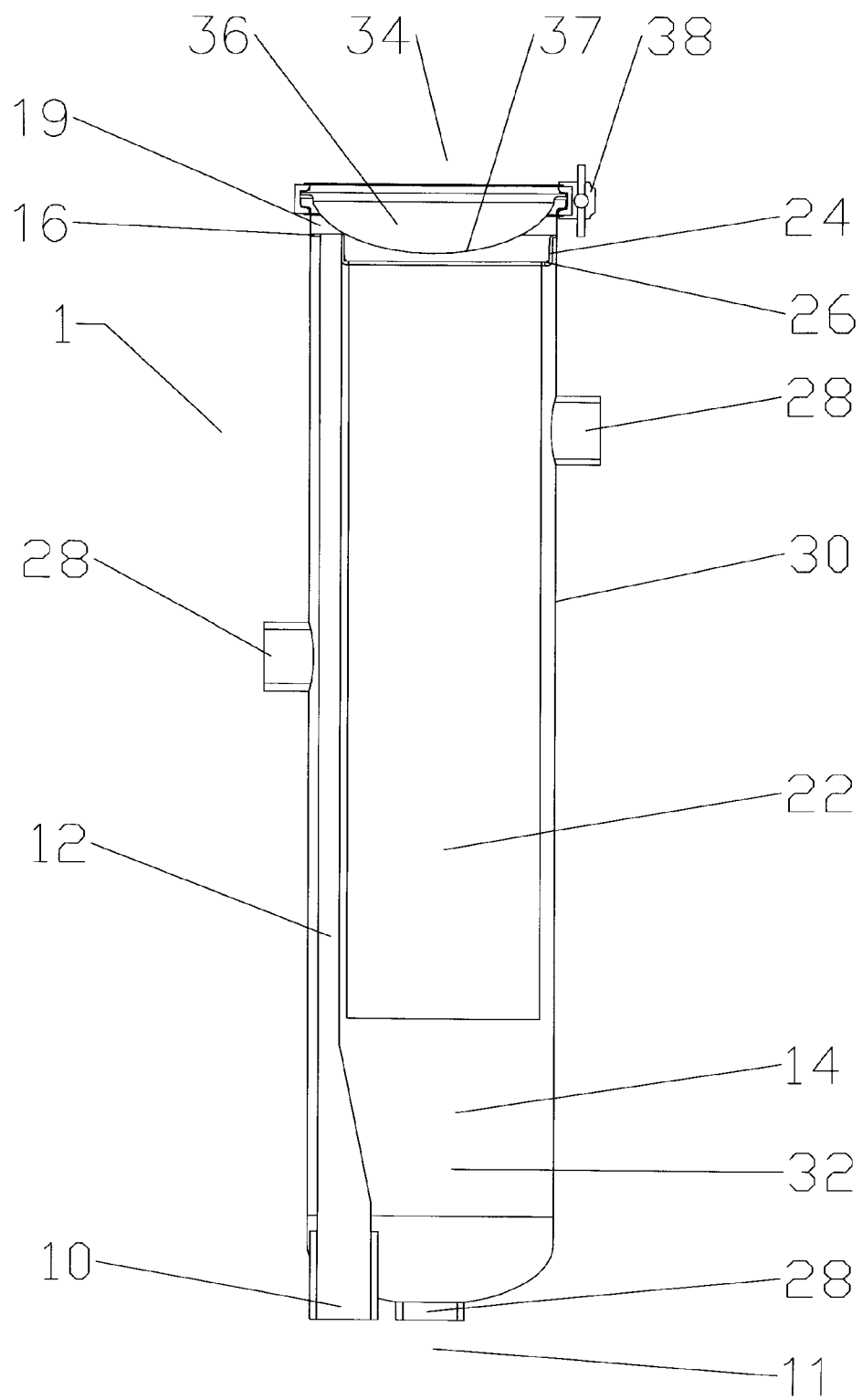
FIG. 2 is a schematic cut-away side view of an exemplary embodiment of a liquid filter, supporting legs removed for clarity.
Figure 3:
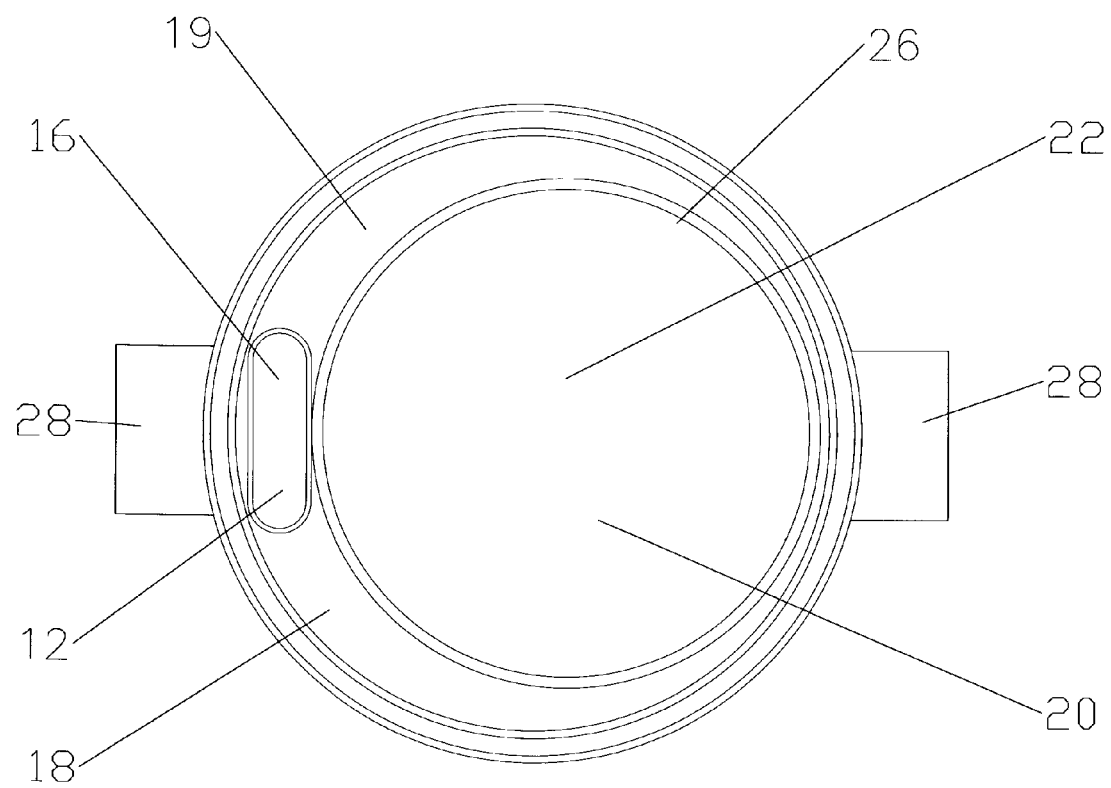
FIG. 3 is a schematic top view of FIG. 2, with the top cover removed for clarity.
Figure 4:
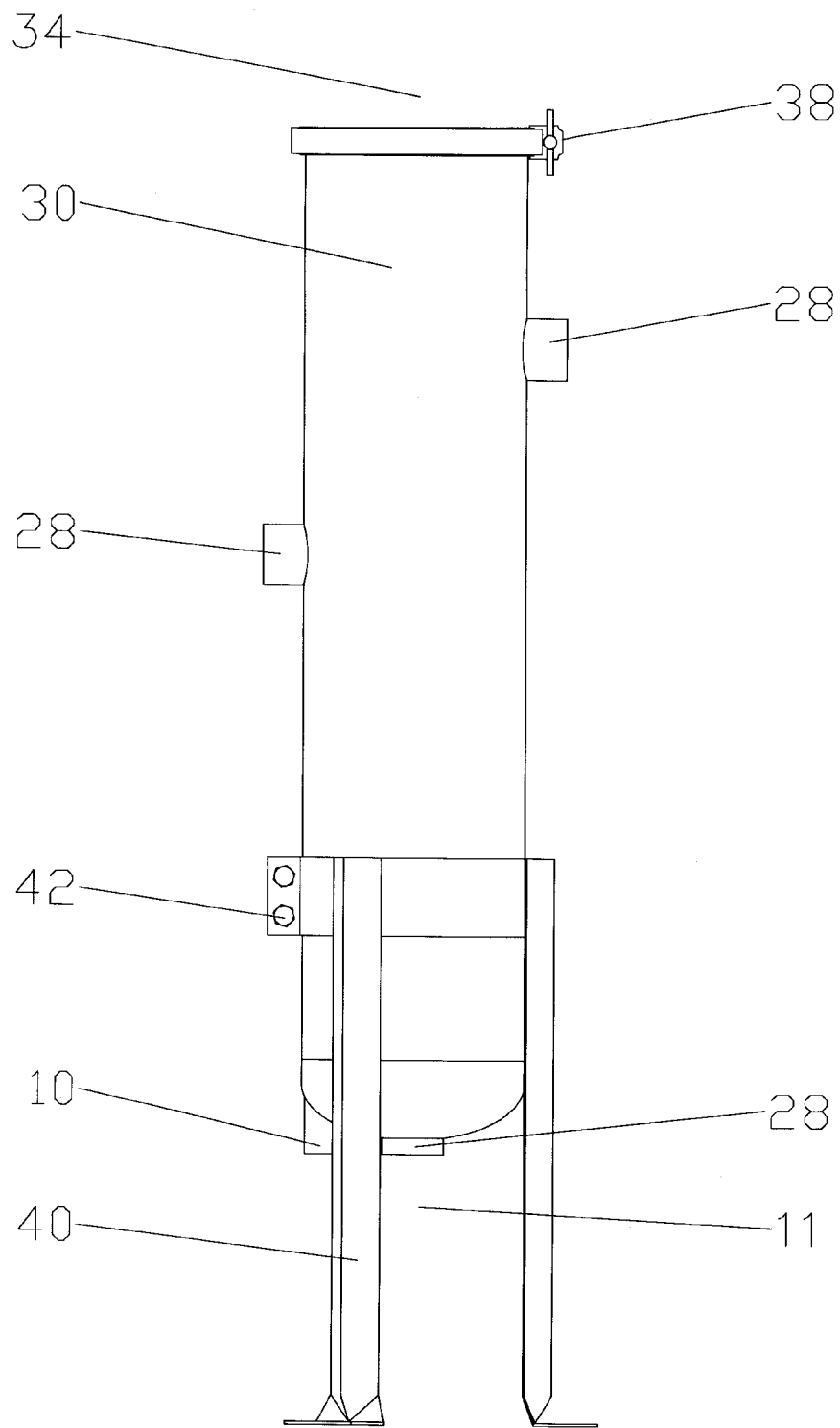
FIG. 4 is a schematic external side view of a filter housing.

An exemplary embodiment of a liquid filter housing 1 according to the various aspects of the invention is shown in FIGS. 2-4. As best shown in FIG. 2, an inlet port 10 is arranged at a bottom end 11 center offset bottom position coupled to an inlet riser pipe 12 extending within a process cavity 14 of the filter housing 1 from the inlet port 10 to an inlet riser hole 16 of a septum plate 18 and therethrough to an upper surface of the septum plate 18 positioned in a top area of the process cavity 14. The inlet riser pipe 12 may be welded to the inlet port 10 and the septum plate 18 and the septum plate 18 periphery may be welded to the sidewall 30 of the filter housing 1 to form a permanent seal against leakage. As best shown in FIG. 3, a filter hole 20 in the septum plate 18 is eccentric from a coaxial position with respect to a longitudinal axis centerline of the filter housing 1 to maximize the diameter of the filter hole 20 without overlapping the inlet riser hole 16. The filter hole 20 is operative as a shoulder for supporting a filter 22. A downward extending collar 24 and bottom annular shoulder 26 of the filter hole 20 may be added to provide circumferential vertical sealing and/or alternative retaining surface(s) for the filter 22.

One skilled in the art will appreciate that the filter 22 may be any form of filter medium, such as a filter cartridge, strainer basket and/or a filter bag seated within a strainer basket, selected according to the desired level of filtering in a tradeoff between filtering level, cost and required exchange interval for a specific process liquid and flowrate.

An outlet port 28 may be positioned at the bottom of the filter housing, for example concentric with a diameter of the filter housing 1. Alternatively, outlet port(s) 28 may be located on the filter housing 1 sidewall 30. Process flow in the inlet port 10 is coupled to the top of the septum plate 18, an inlet side 19 of the process cavity 14 by the inlet riser pipe 12. The process flow then passes through the filter hole 20 and through the selected filter element and/or filter basket 22 to the clean side 32 of the process cavity 14 and out the outlet port 28.

A top cover 36 seals the top end 34 of the filter housing 1, removable for inspection of the process cavity 14 and/or filter 22 exchange. The top cover 36 is formed with an inward extending dome 37. The inward extending dome 37 provides several benefits. The domed shape improves the pressure capacity of this element by extending the surface area thereupon which the pressure within the process cavity 14 acts. Thereby, the top cover 36 may be formed from cost efficient material having a significantly reduced material thickness, for example the same material as the housing sidewall 30, without significantly reducing the pressure capacity of the resulting filter housing 1. The top cover 36 may be retained in the closed position by a clamp 38. Alternatively, a threaded interconnection, bolts, swing hinges or the like may be applied.

The septum plate 18 may be positioned vertically within the process cavity 14 whereby the inward extending dome 37 extends towards the portion of the filter hole 20, a position along a circumference of the filter hole 20, which is closest to the inlet riser hole 16. Thereby, the inward extending dome 37 of the top cover 36 biases and retains the filter 22 within the filter hole 20 at one side, without blocking process flow out of the inlet riser hole 16, around the sides of the inward extending dome 37 and into the filter hole 20 and filter 22 at the far side from the retaining inward extension of the inward extending dome 37 of the top cover 36 proximate the portion of the filter hole 20 closest to the inlet riser hole 16.

Similarly, a portion of the inward extending dome 37 of the top cover 36 may extend below the top of the septum plate 18, within the filter hole 20, displacing filter housing volume such that when the top cover 36 is removed, any process fluid present above the septum plate 18 fills the space previously filled by the inward extending domed shape. Thereby, the static process liquid level in the filter housing 1 when the top cover 36 is removed may be configured to be below the top of the filter, enabling inspection and/or exchange of same without requiring the operator to reach into the process fluid.

The filter housing 1 bottom inlet configuration greatly simplifies process piping interconnections and reduces the space requirements of the overall system. For example, the bottom inlet port 10 may be directly coupled to the output port of a process pump, eliminating the prior need for either an above ground level support for the process pump, or interconnecting process piping. For ease of configuration, as shown for example in FIG. 4, the filter housing 1 may be provided with support leg(s) 40 with an adjustable height feature determined by the vertical position along the outside diameter of the filter housing 1 where the support leg(s) 40 are clamped in place, for example by clamp bolt(s) 42. In a process pump outlet direct connection to the inlet port 10 configuration, placement of the filter housing 1 in close proximity to the process pump greatly reduces the space required for the filter portion of the surrounding processing system.

To minimize an interfering effect upon process flow on the clean side of the septum plate 18, the inlet riser pipe 12 may be formed with portions having a flattened circular and/or oval cross section. The inlet riser pipe may be permanently sealed in place, for example by welding, eliminating the chance for leakage of process liquid at connections between the filter housing 1 and the inlet riser pipe 12 and/or the septum plate 18.

In further embodiments, the bottom only inlet and outlet port 10, 28 configuration described herein may be configured for higher process flows and/or filter media surface area by increasing the diameter of the filter housing 1 and including multiple filter hole(s) 20 in the septum plate 18, each filter hole 20 supporting a separate filter 22.

One skilled in the art will appreciate that the present invention may represent a significant cost savings with respect to required materials, components, manufacturing and servicing. Further, the present invention may reduce the level of interconnection complexity and system footprint when incorporated into a larger system.

| Table of Parts | |
|---|---|
| 1 | filter housing |
| 10 | inlet port |
| 11 | bottom end |
| 12 | inlet riser pipe |
| 14 | process cavity |
| 16 | inlet riser hole |
| 18 | septum plate |
| 19 | inlet side |
| 20 | filter hole |
| 22 | filter basket |
| 24 | collar |
| 26 | annular shoulder |
| 28 | outlet port |
| 30 | sidewall |
| 32 | clean side |
| 34 | top end |
| 36 | top cover |
| 37 | inward extending dome |
| 38 | clamp |
| 40 | support leg |
| 42 | claimp bolt |

Where in the foregoing description reference has been made to ratios, integers, materials, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

I claim:

1. A liquid filter, comprising:
a filter housing with an inlet port located on a bottom end; the inlet port coupled to an inlet riser pipe extending within the filter housing to an inlet riser hole of a septum plate; the septum plate provided with a filter hole; the filter hole non-concentric with a diameter of the filter housing; and a filter seated within the filter hole, the septum plate and the filter dividing the filter housing between an inlet side and a clean side; the inlet port coupled with the inlet side via the inlet riser hole and an outlet port coupled with the clean side.

2. The liquid filter of claim 1, further including a top cover on a top end of the filter housing; the top cover provided with an inward extending dome, the top cover retaining the filter against the septum plate.

3. The liquid filter of claim 1, further including a top cover on a top end of the filter housing; the top cover provided with an inward extending dome, the top cover contacting the filter proximate a position along a circumference of the filter hole closest to the inlet riser hole, biasing the filter against the septum plate.

4. The liquid filter of claim 1, wherein the filter hole further includes a downward extending collar and a bottom annular shoulder.

5. The liquid filter of claim 1, wherein a periphery of the septum plate seals against a sidewall of the filter housing.

6. The liquid filter of claim 1, wherein the septum plate provides a seal between the inlet side and the clean side, except for the filter hole.

7. The liquid filter of claim 1, wherein the filter is a strainer basket.

8. The liquid filter of claim 1, wherein the filter is a filter cartridge.

9. The liquid filter of claim 1, wherein the filter is a filter bag seated within a strainer basket.

10. The liquid filter of claim 1, wherein the inlet port is located at a center offset position on the bottom end.

11. The liquid filter of claim 1, wherein the outlet port is centered on the bottom end.

12. The liquid filter of claim 1, wherein the outlet port is on a sidewall of the filter housing.

13. The liquid filter of claim 1, wherein the inlet riser pipe has an oval cross section.

14. The liquid filter of claim 1, wherein the inlet riser pipe is permanently coupled between the inlet port and the inlet riser hole of the septum plate.

15. A liquid filter, comprising:
a filter housing with an inlet port located on center offset position of a bottom end;
the inlet port coupled to an inlet riser pipe extending within the filter housing to an inlet riser hole of a septum plate;
the septum plate, sealed against a sidewall of the filter housing along a periphery of the septum plate, provided with a filter hole provided with a downward extending collar and a bottom annular shoulder;
the filter hole non-concentric with a diameter of the filter housing;
a filter seated within the filter hole, the septum plate and the filter dividing the filter housing between an inlet side and a clean side;
the inlet port coupled with the inlet side via the inlet riser hole and an outlet port centered on the bottom end coupled with the clean side;
a top cover on a top end of the filter housing; the top cover provided with an inward extending dome, the top cover contacting the filter proximate a position along a circumference of the filter hole closest to the inlet riser hole, biasing the filter against the septum plate.

* * * * *